Aug. 8, 1950 C. S. RHOADS 2,518,374
MAGNETO TELEPHONE ARRANGEMENT FOR DIRECT CURRENT
Filed Dec. 5, 1946
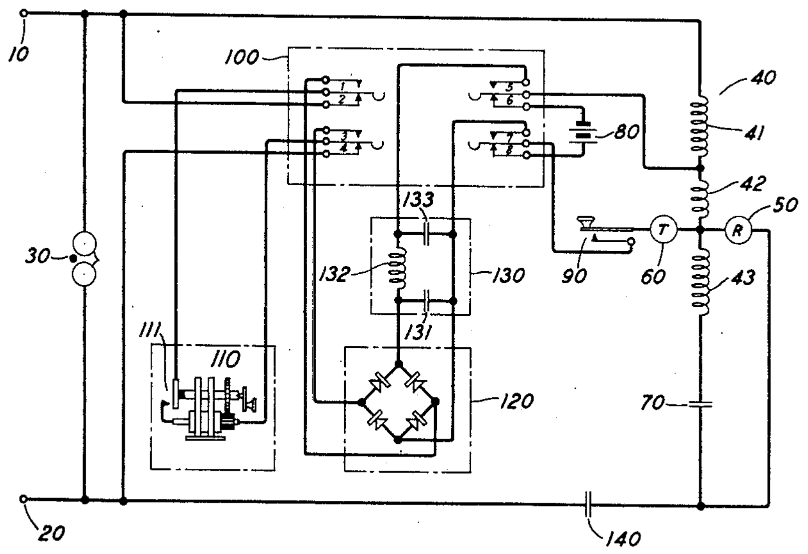
INVENTOR
BY C. S. RHOADS
Walter C. Kiesel
ATTORNEY Patented Aug. 8, 1950

2,518,374

UNITED STATES PATENT OFFICE 2,518,374

MAGNETOTELEPHONE ARRANGEMENT FOR DIRECT CURRENT

Charles S. Rhoads, Yonkers, N. Y., assignor to Bell Telephone Laboratories, Incorporated, New York, N. Y., a corporation of New York Application December 5, 1946, Serial No. 714,209

3 Claims. (Cl. 179—81)

This invention relates to telephone set circuits and more particularly to portable telephone set circuits, employing a hand generator or magneto.

An object of this invention is to make use of the hand generator output of a magnetotelephone set for other than or in addition to signaling purposes.

Magnetotelephone sets, as is well known in the art, include a hand generator, a receiver circuit, a transmitter circuit, and a local battery. The local battery usually consists of two or more dry batteries. The hand generator when cranked at usual speed develops alternating current at a low frequency rate customarily substantially twenty-cycle per second frequency. The hand generator current of this frequency customarily is for operating polarized bells of other such magnetotelephone sets, and also for operating signal receiving devices such as magnetoswitchboard drops, cold cathode tube signals, etc. that may be connected to magnetotelephone lines.

Portable magnetotelephone sets usually include a hand generator, and a handset including a transmitter, a receiver and a device to close the circuit from the local battery to the transmitter. This device can be operated by the fingers of the hand that holds the handset, and is usually called the push-to-talk switch.

Light weight is desirable in portable magnetotelephone sets and in some practical or commercial designs small so-called flashlight dry batteries are used to supply the transmitter current to minimize weight. Other designs may use larger so-called six-inch dry batteries. Whether the dry batteries are large or small, they are subject to various adverse effects. In cold climates where temperatures may become zero or lower dry batteries freeze which reduces their voltage so much that their output becomes insufficient for satisfactory telephone transmission. In hot humid climates dry batteries deteriorate rapidly. In any climate dry battery life is comparatively short due to the energy consumption from use and also from internal chemical action when idle. As a result of these climatic, use and age effects, magnetotelephone dry battery performance is variable and unreliable.

The hand generator in a magnetotelephone set usually is a reliable device and is little affected by climate, use or age. One of the objects of this invention is to permit use of the hand generator as a reliable source of transmitter current either as a supplement to the conventional battery source, or as a sole source of the transmitter or talking current for the magnetotelephone set.

This invention accomplishes this object by providing means for converting the alternating current output of the hand generator to direct current, smoothing out this direct current by a filtering device and using the resulting direct current in the transmitter circuit of the magnetotelephone set.

Other objects and features of the invention will appear more fully from the detailed description thereof hereinafter given.

Although a preferred form of the invention relates to a portable magnetotelephone set, it is not limited thereto. Also the use of the converted current of the hand generator is not limited to use as transmitter current but, in addition to or instead of, may be made available for other uses, for example, as power supply to a vacuum tube amplifier to increase the volume of receiver voice current waves in the telephone set.

A more complete understanding of the invention may be obtained from the detailed description that follows when read in connection with the accompanying drawing, the single figure of which is illustrative of a magnetotelephone set circuit embodying the invention.

With reference to the drawing, the circuit configuration and the character of the components of the circuit of a telephone set in accordance with this invention are shown. The telephone set comprises a pair of line terminals 10, 20, an incoming signal device or polarized bell 30, a multiwinding induction coil or transformer 40, a telephone receiver 50, a telephone transmitter 60, condensers 70 and 140 for inclusion in the speech current circuits of the set, a source of current or local battery 80, a normally open pair of contact springs or contacts 90, a key operated switching means or device 100 which locks or remains in the operation position when adjusted, moved or thrown from its normal or non-operated position.

All these components may be housed or supported within or on a single container or unit, the receiver and the transmitter may be included in a handset, or in a chest transmitter and headset, and be connected with the circuit through a suitable cord or cords. The telephone receiver may be of the type disclosed in L. A. Morrison et al. Patent 2,220,942, of November 12, 1940, for Acoustic Device, and the telephone transmitter may be of the type shown in A. F. Bennett et al. Patent 2,042,822 of June 2, 1936, for Telephone Transmitter. The rectifying means 120 may be of the so-called full wave copper oxide type. The filtering means 130 may be of the retardation coil and condenser type. The switching device 100 may comprise a manually operable two-position key or button and four sets of contact spring pile-ups. This switching device 100 is shown in its normal or non-operated position under which condition contact pairs 1, 3, 5 and 7 are open and contact pairs 2, 4, 6 and 8 are closed. When the key is operated, contact pairs 2, 4, 6 and 8 are opened and pairs 1, 3, 5 and 7 are closed. The contact switch 90 may be of the so-called push-to-talk type, that is, pressure applied, for example, by the fingers of the user of the set, is required to maintain the switch closed. Provision of the push-to-talk switch insures, when the set is not in use, that there is no drain on the local battery 80, and, when the set is in use, that the user when not talking may economize with respect to the local battery 80 as well as minimize noise pick-up by the transmitter.

The multiwinding transformer 40 comprises three windings 41, 42 and 43, serially connected with the condenser 70 across the line terminals 10, 20. The transmitter 60, contact pair 90, contact pairs 6 and 8 of the switch 100, and the local battery 80 constitute a series-connected circuit across winding 42 of the induction coil. This battery and transmitter circuit is the normal circuit and is for use when the batteries are in condition to provide satisfactory outgoing transmission from the telephone set. The receiver 50 is connected across the series-connected transformer winding 43 and condenser 70. The windings of transformer 40 are wound on a common core and together with the receiver and transmitter constitute an anti-sidetone circuit of the type shown in schematic in Fig. 1 of K. S. Johnson Patent 1,396,760 of November 15, 1921, for Signaling Circuit. The winding 43 is proportioned so as to include sufficient resistance to constitute the balancing network or resistance in shunt with the receiver.

When signaling current is incoming to the telephone set circuit at terminals 10, 20 thereof, supplied for example over a suitable line, for example, the standard steel wire telephone pair, such as is used in military field telephone systems, and from an exchange or switchboard, for example, at the field headquarters point, the polarized bell 30 is actuated over a path from line terminal 10, polarized bell 30, to line terminal 20. When the switching device is in its normal or non-operated position, with the receiver 50 at the ear and the transmitter 60 adjacent the mouth, the called party, after closing the push-to-talk switch 90, may respond and transmit speech currents out of the set circuit making use of local battery 80, through line terminals 10, 20 and receive speech currents incoming over the telephone line through the terminals 10, 20.

When it is desired to signal outwards from the telephone set to the line, the hand generator 110 is cranked by means of the handle provided on it for that purpose. With key or switch 100 in its normal or non-operated position, the hand generator 100 is serially connected from line terminal 10 through normally made contacts 2 and 4 of switch 100, to line terminal 20. As is well known in the art, hand generator 110 includes an automatic contact closing device 111, which closes a pair of contacts in a pile-up of contact springs when the crank of the hand generator is turned and which contacts automatically open to their non-operated condition when cranking ceases.

The rectifying device 120 can be of the copper oxide type for full wave rectification which is a type of rectifier well known in the art but is not limited thereto. The filtering unit 130 can comprise, for example, but is not limited thereto, of two condensers 131, 133 and an impedance coil 132.

The procedure to be followed when it is desired to make use of the hand generator as a source of transmitter current is as follows: The switching device 100 is adjusted or moved to its locking position whereby contact pairs 2, 4, 6 and 8 are opened and contact pairs 1, 3, 5 and 7 are closed. The opening of contact pairs 2 and 4 disconnects the hand generator circuit from the line terminals 10 and 20. The closing of contact pairs 1 and 3 connects the hand generator circuit to the rectifier device 120. The opening of contact pairs 6 and 8 disconnects the local battery 80 from the transmitter circuit. The closing of contact pairs 5 and 7 connects the circuit of the filtering device 130 to the transmitter circuit. With the receiver 50 to his ear and the transmitter 60 adjacent his mouth the user of the telephone set will crank the hand generator 110 to develop its full voltage and then after closing the push-to-talk switch 90 in the handset may respond and transmit speech currents out of the set circuit through the line terminals 10, 20, and receive speech currents incoming over the telephone line terminals 10, 20. In the circuit arrangement shown in the figure, it is not necessary to crank the hand generator 110 in receiving speech currents but only to transmit speech currents.

The word "rectifying" as used herein denotes the converting of the alternating current to direct current. The word "filtering" as used herein denotes the smoothing out of the direct current wave, and the devices used to perform this function are called filters.

Although the preferred form of the invention as shown is a portable telephone set making use of a part of the switching device to disconnect the battery from the transmitter circuit, another form of the invention is a magneto telephone set without a battery, and which has only the hand generator output for supplying transmitter current. This form of the invention is useful for installation where the telephone set is relatively inaccessible for maintenance and where it may remain unused for long periods of time but where full efficiency of transmission is imperative when it is used, as for example at an outlying coast artillery observation post.

What is claimed is:

1. A telephone set circuit comprising line terminals, a transmitting circuit connected across said terminals for generating and transmitting voice frequency current out of said set circuit, an alternating current hand generator for signaling out of said set circuit and normally connected across said terminals, means for rectifying and filtering alternating current, and a hand operated switch for disconnecting said hand generator from said line terminals and connecting it to said rectifying and filtering means and for connecting said rectifying and filtering means into said transmitting circuit to constitute the sole source of transmitter current thereto.

2. A telephone set circuit comprising line terminals, a transmitting circuit connected across said terminals for generating and transmitting voice frequency current out of said set circuit, an alternating current hand generator for signaling out of said set circuit and normally connected across said terminals, means for converting alternating current to direct current and connected to a filter for smoothing the wave shape of said direct current, said filter being connected into said transmitting circuit, and a hand operable key for disconnecting said hand generator from said line terminals and connecting it to said rectifier whereby said generator constitutes the sole source of current in said transmitting circuit.

3. A telephone set circuit comprising line terminals, a transmitting circuit connected across said terminals for generating and transmitting voice frequency current out of said set circuit, an alternating current hand generator for signaling out of said set circuit and normally connected across said terminals, a rectifier for converting alternating current to direct current and having input and output terminals, a filter network for smoothing the wave shape of direct current and having input and output terminals, said output terminals of said rectifier being connected to said input terminals of said filter network, said output terminals of said filter being connected into said transmitting circuit, and a hand operable switching key for disconnecting said hand generator from said line terminals and connecting it to said input terminals of said rectifier whereby said generator constitutes the sole source of current in said transmitting circuit.

CHARLES S. RHOADS.

REFERENCES CITED

The following references are of record in the file of this patent:

UNITED STATES PATENTS

| Number | Name | Date |
|---|---|---|
| 1,396,760 | Johnson | Nov. 15, 1921 |
| 1,843,250 | Spencer | Feb. 2, 1932 |
| 2,050,292 | Eaton | Aug. 11, 1936 |
| 2,117,018 | Conrad | May 10, 1938 |
| 2,236,105 | McLarn | Mar. 25, 1941 |
| 2,305,378 | Cypsen | Dec. 15, 1942 |
| 2,346,548 | Atkins | Apr. 11, 1944 |

OTHER REFERENCES

Miller: Telephone Theory and Practice, 1st edition, 1933 (page 364).

TM 11-1344 War Department Technical Manual, Dec. 15, 1944 (pages 9, 25 and 27).